United States Patent

Tashiro et al.

[11] 3,882,490
[45] May 6, 1975

[54] INDICATING DEVICE

[75] Inventors: Hiroyuki Tashiro; Susumu Urano, both of Kariya, Japan

[73] Assignee: Nippondenso Co., Ltd., Kariya, Japan

[22] Filed: July 30, 1973

[21] Appl. No.: 383,547

[30] Foreign Application Priority Data
Aug. 11, 1972   Japan.............................. 47-95031

[52] U.S. Cl........ 340/366 B; 350/160 LC; 240/2 R; 58/50 R
[51] Int. Cl. ............................................. G08b 5/00
[58] Field of Search........ 340/366 R, 366 B, 324 M, 340/336; 350/160 LC; 58/50 R; 240/2 R, 2 AT

[56] References Cited
UNITED STATES PATENTS

| | | | |
|---|---|---|---|
| 3,322,485 | 5/1967 | Williams | 350/160 LC |
| 3,612,654 | 10/1971 | Klein | 350/160 R |
| 3,668,861 | 6/1972 | Mitsui | 58/50 R |
| 3,674,341 | 7/1972 | Hedman, Jr. et al. | 350/160 R |
| 3,722,206 | 3/1973 | Bergey | 58/50 R |
| 3,734,598 | 5/1973 | Aiken | 350/160 LC |

OTHER PUBLICATIONS

Jurgen; R. K., *Information Displays: Innovation is the Rule*, IEEE Spectrum, Nov. 1972, page 18.

*Primary Examiner*—John W. Caldwell
*Assistant Examiner*—William M. Wannisky
*Attorney, Agent, or Firm*—Cushman, Darby & Cushman

[57] ABSTRACT

An indicating device is provided which comprises a liquid crystal element in plate form disposed in the front part of the device and having a light transmission factor which changes considerably with variation of the voltage applied thereto, a detecting switch for detecting variation of a quantity or condition to be detected, a light emitting diode disposed in the rear of the liquid crystal element, and a reflecting plate for reflecting an external light, wherein the liquid crystal element is connected in parallel with the detecting switch and a resistor for dividing the voltage of a power supply, and in the normal conditions (when the switch is off) a predetermined bias voltage is applied to the liquid crystal element, whereby when a variation of the quantity or condition is detected (when the switch is on), the light transmission factor of the liquid crystal element increases making it nearly transparent and therefore indication of a warning or the like is given by the light from the normally energized light emitting diode, particularly in the daytime the light reflected from the reflecting plate is also added.

3 Claims, 8 Drawing Figures

PATENTED MAY 6 1975　　3,882,490

INDICATING DEVICE

BACKGROUND OF THE INVENTION

1. Field of the Invention

The present invention relates to indicating devices such as a charge indicating lamp for the battery installed in an automobile, side-brake warning lamp and so on.

2. Description of the Prior Art

In known indicating devices of this type, as for example illustrated in FIG. 8 of the accompanying drawings, a plastic lens 16 is securely mounted in the front of a tungsten lamp 15 securely mounted on a supporting plate 8, whereby indication of a warning or the like is given by the lighting or flashing of the lamp 15.

A drawback of the indicating devices of the type shown in FIG. 8 is that the use of the tungsten lamp 15 results in a poor resistance of the device against shock and vibration and therefore the life of the device will be reduced considerably if it is installed for example in a bulldozer where the indicating device is subjected to severe vibrating conditions. There is a further drawback in that the generation of heat by the lamp 15 when it is in operation, exerts an unfavorable effect on other devices.

SUMMARY OF THE INVENTION

With a view to overcoming the foregoing deficiency, it is an object of the present invention to provide an indicating device in which a conventionally used lens is replaced with a liquid crystal element in plate form whose light transmission factor changes considerably as the applied voltage changes and at the same time a light emitting diode is employed as a light source and which is thus highly resistant against shock and vibration, capable of completely neglecting the effect of its heat generation on other instruments owing to its reduced power consumption and also capable of performing the similar indicating function as the conventional devices.

The present invention has a remarkable advantage in that since the device of the present invention comprises a liquid crystal element in plate form whose light transmission factor changes considerably as the applied voltage changes, a detecting switch for detecting variation of a quantity or condition to be detected and coming into operation to change the voltage applied to the liquid crystal element and a light emitting diode disposed in the rear of the liquid crystal element, as compared with the conventional indicating devices employing a tungsten lamp, the device of this invention has an improved resistance against shock and vibration and is longer in life and also the generation of heat has no adverse effect on other instruments owing to the reduced power consumption of the liquid crystal element. A further advantage is that since the device of this invention comprises a reflecting plate mounted in such a manner that the incident light from the front of the liquid crystal element is reflected back to the liquid crystal element, in the daytime with the liquid crystal element being close to transparency, the external light reflected from the reflecting plate illuminates the liquid crystal element along with the light from the light emitting diode with the result that whether the liquid crystal element is being illuminated bright can be fully confirmed even in the daytime.

BRIEF DESCRIPTION OF THE DRAWING

In the drawings, the same reference numerals are employed for the identical or equivalent component parts.

DESCRIPTION OF THE PREFERRED EMBODIMENT

Figure 1:
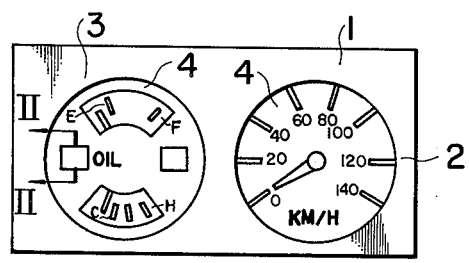
FIG. 1 is a front view of automobile instruments incorporating the device of the present invention.
Figure 2:
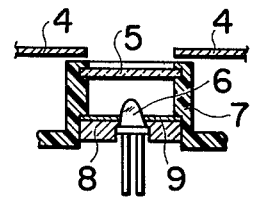
FIG. 2 is an enlarged sectional view taken along the line II—II of FIG. 1 showing an embodiment of an indicating device according to the present invention.
Figure 3:
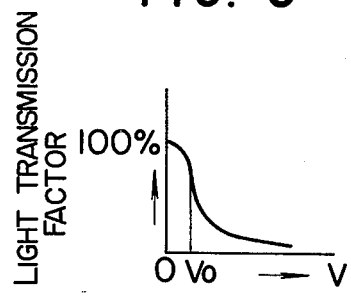
FIG. 3 is a voltage versus transmission factor diagram of the liquid crystal element employed in the device of the present invention.
Figure 4:
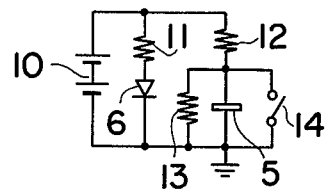
FIG. 4 is an electric wiring diagram of the embodiment of the indicating device according to the present invention.
Figure 7:
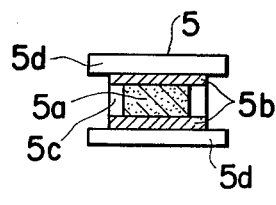
FIG. 7 is an enlarged sectional view of the liquid crystal element employed in the device of this invention.
Figure 8:
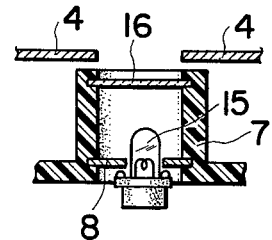
FIG. 8 is an enlarged sectional view of a prior art indicating device.

The present invention will now be explained with reference to the illustrated embodiment. Referring first to FIGS. 1, 2 and 4, numeral 1 designates a plastic hood covering the instruments of an automobile, numeral 2 a speedmeter for indicating the speed of the vehicle, numeral 3 a combination meter comprising a fuel gauge, a water temperature gauge and so on, numeral 4 a dial made of metal or the like for each of the speedmeter 2 and the combination meter 3. Numeral 5 designates a liquid crystal element in plate form which serves as a lens and is of a known construction as shown in FIG. 7. More particularly, the liquid crystal element 5 comprises a liquid crystal 5a having a new electro-optic effect so that, as shown in FIG. 3, it has a high light transmission factor and thus becomes transparent when the applied voltage is lower than $V_o$, but its light transmission factor decreases considerably causing it to become opaque when the applied voltage becomes higher than $V_o$ in any degree, a transparent electrode 5b for applying a voltage to the liquid crystal 5a, a spacer 5c for maintaining a desired external shape and glass sheets 5d. Numeral 6 designates a light emitting diode which emits light when it is energized and which is disposed in the rear of the liquid crystal element. Numeral 7 designates a light shielding cylinder integrally formed with the metal case for the speedmeter 2 etc., to prevent the light of the light emitting diode 6 from leaking to the sides or preventing the light from other instruments from illuminating the liquid crystal element 5 which is securely mounted on the upper end thereof. Numeral 8 designates a supporting plate securely mounted on the light shielding cylinder 7 to support the light emitting diode 6. Numeral 9 designates a reflecting plate securely mounted on the supporting plate 8 to reflect the incident light through the liquid crystal element 5 back thereto. Numeral 10 designates a battery constituting a power supply, numeral 11 a protective resistor for limiting the flow of current to the light emitting diode 6, numerals 12 and 13 resistors for dividing the power supply voltage of the battery 10 and applying the divided voltage to the liquid crystal element 5. Numeral 14 designates a detecting switch for detecting variation of a quantity or condition to be detected, e.g., the remaining fuel in the tank, the battery current discharge or the engine cooling water temperature, so that the detecting switch is closed when the quantity or condition to be detected reaches a predetermined value.

With the construction described above, the indicating device according to the invention operates as follows. When the quantity to be detected is lower than a predetermined value, the detecting switch 14 is off so that current flows from the battery 10 into the parallel circuit consisting of both the liquid crystal element 5 and the resistor 13 in series with the resistor 12. In this case, the values of the resistors 12 and 13 are such that a voltage higher than $V_o$ in FIG. 3 is applied across the liquid crystal element 5 and therefore the light transmission factor of the liquid crystal 5a in the liquid crystal element 5 descreases to cause the liquid crystal element 5 to become almost opaque. In this case, the light emitted from the normally radiating light emitting diode 6 is not transmitted to the outside through the liquid crystal element 5 and therefore the liquid crystal element 5 appears only dark to the driver.

Figure 5:
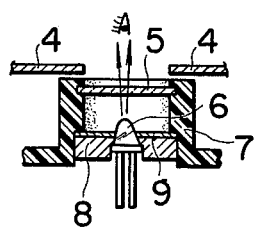
FIG. 5 is an enlarged sectional view showing the direction of travel of light in the device of this invention during the night.

On the other hand, when the value of the quantity to be detected becomes higher than the predetermined value, the detecting switch is closed to short-circuit the liquid crystal element 5. When this occurs, practically no voltage is applied across the liquid crystal element 5 so that the light transmission factor of the liquid crystal element 5 increases to cause it to become almost transparent. Consequently, the light emitted from the normally radiating light emitting diode 6 is transmitted to the outside through the liquid crystal element 5 as shown in FIG. 5, so that the liquid crystal element 5 now appears bright to the driver and thus the driver can positively confirm that indication of a warning is being given.

Figure 6:
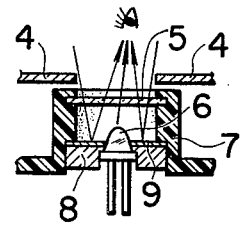
FIG. 6 is an enlarged sectional view showing the direction of travel of light in the device of this invention in the daytime.

The light emitting diode 6 cannot by its nature emit an intense light and its emitted light is thus less intense than the light emitted from a conventional tungsten lamp. Therefore, when the driver's compartment is bright, particularly as in the daytime, even the light from the light emitting diode 6 is transmitted through the liquid crystal element 5 as shown in FIG. 5, there is the danger of the driver failing to confirm whether the liquid crystal element 5 is being illuminated brightly. Contrary to this, the device according to the present invention employs the reflecting plate 9 disposed in the rear of the liquid crystal element 5, whereby when the liquid crystal element 5 is transparent, as shown in FIG. 6, the external incident light is reflected back to the outside through the liquid crystal element 5 and thus not only the light from the light emitting diode 6 but also this reflected external light strike the eye of the driver. Therefore, the device of this invention can satisfactorily perform the function of an indicating device even in the daytime. Of course, there will be practically no external incident light and hence no reflected light from the reflecting plate 9 in the night, but the driver's compartment will also be poorly illuminated thus permitting a satisfactory indication of a warning or the like with only the light emitted from the light emitting diode 6.

While, in the embodiment so far described, the light emitting diode 6 is normally energized, the light emitting diode 6 may of course be adapted so that it is energized only wnen the detecting switch 14 is turned on.

We claim:

1. An indicating device comprising a liquid crystal element in plate form disposed in the front part of the device and having a light transmission factor which changes considerably with variation of a voltage applied thereto, a detecting switch having an on-off operation for detecting variation of a quantity or condition to be detected and connected electrically to said liquid crystal element, a light emitting diode disposed at the rear of said liquid crystal element, and a reflecting plate for reflecting an incident light passing through said liquid crystal element and disposed behind said liquid crystal whereby when the light transmission factor of said liquid crystal element is caused to increase with reduction of a voltage applied across said liquid crystal, indication of a warning or the like is given by the light emitted from said light emitting diode and passing through said liquid crystal.

2. An indicating device according to claim 1, wherein said light emitting diode is normally energized.

3. An indicating device according to claim 1 further comprising resistors for dividing a power supply voltage and applying the power supply voltage divided by said resistors to said liquid crystal element, and wherein said liquid crystal element is connected in parallel with said detecting switch and one of said resistors, whereby practically no voltage is applied across said liquid crystal element when said detecting switch is closed, that is, when a predetermined variation of said quantity or condition is detected, whereas a voltage corresponding to said resistors is applied across said liquid crystal element when said detecting switch is open.

* * * * *